(12) United States Patent
Gordon

(10) Patent No.: US 10,300,877 B2
(45) Date of Patent: May 28, 2019

(54) WINDOW NET DOOR ATTACHMENT

(71) Applicant: Robby Gordon, Charlotte, NC (US)

(72) Inventor: Robby Gordon, Charlotte, NC (US)

(*) Notice: Subject to any disclaimer, the term of this patent is extended or adjusted under 35 U.S.C. 154(b) by 32 days.

(21) Appl. No.: 15/462,435

(22) Filed: Mar. 17, 2017

(65) Prior Publication Data

US 2017/0267198 A1    Sep. 21, 2017

Related U.S. Application Data

(60) Provisional application No. 62/310,502, filed on Mar. 18, 2016.

(51) Int. Cl.
*B60R 21/06* (2006.01)
*B60J 1/20* (2006.01)

(52) U.S. Cl.
CPC .............. *B60R 21/06* (2013.01); *B60J 1/20* (2013.01); *B60Y 2200/20* (2013.01)

(58) Field of Classification Search
CPC ............. B60J 5/0487; E06B 9/00; E06B 9/52
USPC .................................................. 280/748, 749
See application file for complete search history.

(56) References Cited

U.S. PATENT DOCUMENTS

| | | | | |
|---|---|---|---|---|
| 7,556,291 B2 * | 7/2009 | Gale | .................. | B60J 5/065 |
| | | | | 280/749 |
| 8,328,235 B2 * | 12/2012 | Schneider | .............. | B60J 5/0487 |
| | | | | 280/748 |
| 8,465,050 B1 * | 6/2013 | Spindler | .................. | B60R 21/06 |
| | | | | 280/749 |
| 8,714,591 B1 * | 5/2014 | Kobayashi | .............. | B60R 21/06 |
| | | | | 248/72 |
| 9,475,367 B1 * | 10/2016 | Wilson, III | ............ | B60J 5/0487 |
| 2001/0017462 A1 * | 8/2001 | Abels | ..................... | B62D 33/06 |
| | | | | 280/748 |
| 2003/0107209 A1 * | 6/2003 | Haig | ....................... | B60R 21/08 |
| | | | | 280/749 |
| 2007/0057499 A1 * | 3/2007 | Fengel | .................... | B60R 21/06 |
| | | | | 280/749 |
| 2007/0240833 A1 * | 10/2007 | Watson | ................... | B60R 21/06 |
| | | | | 160/105 |
| 2008/0106072 A1 * | 5/2008 | Walston | .................. | B60R 21/08 |
| | | | | 280/728.1 |
| 2009/0243339 A1 * | 10/2009 | Orr | ......................... | B60J 5/0487 |
| | | | | 296/190.03 |
| 2011/0241325 A1 * | 10/2011 | King | ......................... | B60J 5/08 |
| | | | | 280/756 |
| 2014/0306487 A1 * | 10/2014 | Dobrot | .................. | B60J 5/0487 |
| | | | | 296/190.03 |

* cited by examiner

*Primary Examiner* — Toan C To
(74) *Attorney, Agent, or Firm* — Rutan & Tucker, LLP; Hani Z. Sayed

(57) ABSTRACT

A window net door attachment is provided for coupling with a vehicle door to provide protection to occupants within the vehicle during travel over rough terrain or during rolling over of the vehicle. Framed portions of the window net door attachment surround an open area between a top of the vehicle door, a roof, and a windshield area of the vehicle. A window net within a boundary support is attached to the frame portions and to the top of the vehicle door, such that the window net is disposed throughout the open area. Attachments along the boundary support retain the window net in an extended disposition within the open area. Vertical supports may be interwoven with the window net so as to impart relatively greater strength to the window net.

18 Claims, 2 Drawing Sheets

WINDOW NET DOOR ATTACHMENT

PRIORITY

This application claims the benefit of and priority to U.S. Provisional Application, entitled "Window Net Door Attachment," filed on Mar. 18, 2016 and having application Ser. No. 63/310,502.

FIELD

The field of the present disclosure generally relates to vehicle safety. More particularly, the field of the invention relates to a window net door attachment for coupling with a vehicle door to provide protection to occupants within the vehicle during travel over rough terrain or during a rolling over of the vehicle.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, off-road vehicles commonly are used for sight-seeing and traveling to areas that may not be accessed by way of standard, paved roads.

The use of higher clearance, higher traction vehicles enables off-road vehicles to access trails and roads having rough, low traction surfaces that may not be traversed using a standard, on-road vehicle. As such, off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. For example, drivers and passengers typically must be wear safety restraints during off-road travel. A wide variety of different types of safety harnesses are available for use with off-road vehicles.

Unlike on-road vehicles, such as passenger cars, off-road vehicles typically are open, often lacking windows, doors, and body panels common to passenger cars. A frame comprised of multiple structural members with attached doors are configured to protect the occupants in the event of a rollover situation. A drawback to the frames comprising many off-road vehicles is that arms and legs of the driver and passengers are free to extend outside the vehicle during rolling over, potentially leading to serious injuries. Given that off-road vehicles routinely travel over very rough terrain, such as mountainous regions, and are prone to tipping over, there is a desire to improve the safety, convenience, and comfort of off-road vehicles, while at the same improving the performance of such vehicles.

SUMMARY

A window net door attachment is provided for coupling with a vehicle door to provide protection to occupants within the vehicle during travel over rough terrain or during rolling over of the vehicle. Framed portions of the window net door attachment are configured to surround an open area between a top of the vehicle door, a roof, and a windshield area of the vehicle. A window net within a boundary support is attached to the frame portions and to the top of the vehicle door, such that the window net is disposed throughout the open area. The window net may be comprised of a loosely woven material suitable for retaining the occupants within the vehicle, and the boundary support may be comprised of a tightly woven portion that is interwoven with the window net. Attachments along the boundary support are configured to retain the window net in an extended disposition within the open area. Vertical supports may be interwoven with the window net to impart relatively greater strength to the window net. The material used for the window net may be comprised of any suitable material, including being rigid materials.

In an exemplary embodiment, a window net door attachment configured to be coupled with a vehicle door and extend throughout an open area between a top of the vehicle door, a roof, and a windshield area of the vehicle is comprised of a front frame portion configured to extend from a front of the top of the vehicle door toward a lower portion of the windshield area and then extend upward adjacent to the windshield area; a top frame portion configured to extend from an upper-most end of the front frame portion rearward adjacent to the roof; a rear frame portion configured to join with a rearward-most end of the top frame portion and extend downward to a rear of the top of the vehicle door; and a window net disposed within a boundary support that is attached to the front frame portion, the top frame portion, and the rear frame portion and to the top of the vehicle door, such that the window net extends throughout the open area.

In another exemplary embodiment, the window net door attachment is configured to provide protection to occupants within the vehicle during travel over rough terrain and during rolling over of the vehicle. In another exemplary embodiment, any of the front frame portion, the top frame portion, and the rear frame portion may be comprised of one or more bends, angled portions, and curves, such that the window net door attachment optimally surrounds the open area. In another exemplary embodiment, the front frame portion, the top frame portion, and the rear frame portion comprise separate components that may be assembled to extend around the open area. In another exemplary embodiment, the front frame portion, the top frame portion, and the rear frame portion comprise a single component that is configured to extend around the open area. In another exemplary embodiment, the front frame portion, the top frame portion, and the rear frame portion are comprised of a material that is suitably rigid so as to sustain impact forces and retain occupants within the vehicle during travel over rough terrain and rolling over of the vehicle.

In another exemplary embodiment, the front frame portion and the rear frame portion are welded onto suitable portions of the vehicle door. In another exemplary embodiment, the front frame portion and the rear frame portion are fastened to the vehicle door by way of any of various suitable hardware fasteners. In another exemplary embodiment, the front frame portion and the rear frame portion are configured to be fixedly received into suitably configured slots disposed on the vehicle door. In another exemplary embodiment, the vehicle door and the window net door attachment are manufactured as a single component that is ready for installation onto the vehicle.

In another exemplary embodiment, the window net is comprised of a loosely woven material suitable for retaining the occupants within the vehicle, and wherein the boundary support comprises a tightly woven portion that is interwoven with the window net. In another exemplary embodiment, a plurality of attachments are disposed along the boundary support and configured to retain the window net in an extended disposition within the open area, the plurality of attachments being comprised of any of various suitable hardware fasteners. In another exemplary embodiment, one or more vertical supports are disposed within the window net and extend from a top to a bottom of the boundary support, the one or more vertical supports being tightly woven strips that are interwoven with the window net and configured to impart relatively greater strength to the window net. In another exemplary embodiment, a hand hole is disposed at a bottom of the window net and near the top of the occupant door, and wherein the boundary support extends around the hand hole to provide support to, and discourage fraying of, the window net.

In an exemplary embodiment, a window net door attachment configured to be coupled with a vehicle door and extend throughout an open area between a top of the vehicle door, a roof, and a windshield area of the vehicle is comprised of a front frame coupled with a forward portion of the vehicle door and disposed adjacently along the windshield area; a top frame coupled with the front frame and disposed adjacently along the roof; a rear frame joined with the top frame and extending to a rearward portion of the vehicle door; and a window net attached to one or more of the top of the vehicle door, the front frame, the top frame, and the rear frame.

In another exemplary embodiment, the front frame, the top frame, and the rear frame are configured to be coupled so as to extend around the open area, the front frame and the rear frame being configured to be coupled with the vehicle door. In another exemplary embodiment, the window net door attachment is configured to provide protection to occupants during rolling over of the vehicle. In another exemplary embodiment, the window net is interwoven with a boundary support that includes a plurality of attachments that are configured to retain the window net in an extended disposition within the open area. In another exemplary embodiment, the window net is comprised of a hand hole disposed near the top of the vehicle door. In another exemplary embodiment, the window net is comprised of one or more vertical supports that extend from a top to a bottom of the boundary support, the one or more vertical supports being tightly woven strips that are interwoven with the window net and configured to impart relatively greater strength to the window net.

BRIEF DESCRIPTION OF THE DRAWINGS

The drawings refer to embodiments of the present disclosure in which.

Figure 1:
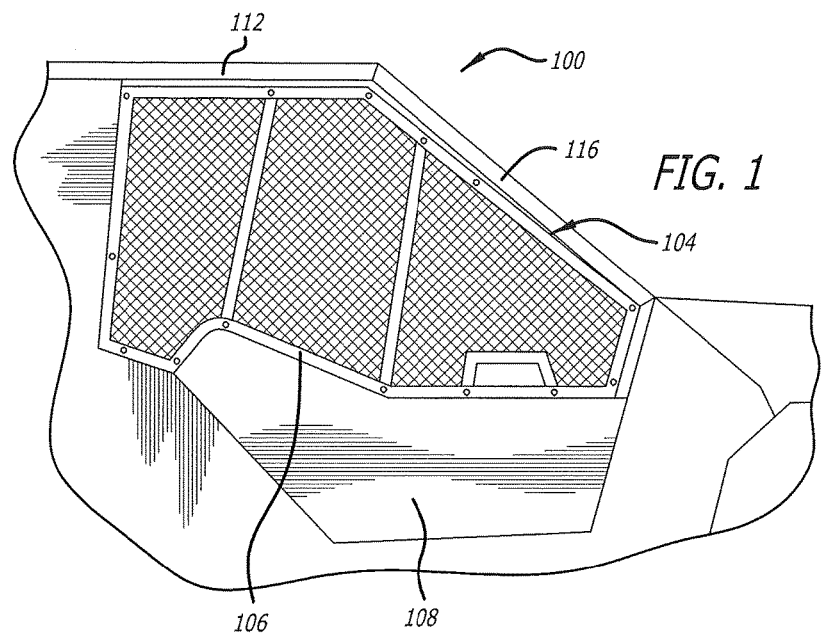
FIG. 1 is a side view of an off-road vehicle comprising an exemplary window net door attachment coupled with a passenger door of the vehicle.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first attachment," may be made. However, the specific numeric reference should not be interpreted as a literal sequential order but rather interpreted that the "first attachment" is different than a "second attachment." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes a window net door attachment configured to be coupled with a vehicle door and extend throughout an open area between a top of the vehicle door, a roof, and a windshield area of the vehicle. The window net door attachment is configured to provide protection to occupants within the vehicle during travel over rough terrain or during a vehicle rollover situation. The window net door attachment comprises a front frame portion configured to extend from a front of the top of the vehicle door toward a lower portion of the windshield area and then extend upward adjacent to the windshield area. A top frame portion is configured to extend from an upper-most end of the front frame portion rearward adjacent to the roof. A rear frame portion is configured to join with a rearward-most end of the top frame portion and extend downward to a rear of the top of the vehicle door. A window net is disposed within a boundary support that is attached to the front, top, and rear frame portions and to the top of the vehicle door, such that the window net extends throughout the open area. A plurality of attachments may be disposed along the boundary support and configured to retain the window net in an extended disposition within the open area. In some embodiments, the attachments may be configured to enable the occupants to readily detach the window net from the front, top, and rear frame portions, such as during an emergency wherein the passenger door cannot be opened. One or more vertical supports may be disposed within the window net and extend from a top to a bottom of the boundary support. The vertical supports may be tightly woven strips that are interwoven with the window net and configured to impart relatively greater strength to the window net.

FIG. 1 is a side view of an off-road vehicle 100 comprising an exemplary window net door attachment 104 coupled with a passenger door 108 of the vehicle. The window net door attachment 104 generally is configured to be coupled with the passenger door 108 so as to extend throughout an open area between a top 106 of the passenger door 108, a roof 112, and a windshield area 116 of the vehicle. The window net door attachment 104 is configured to provide protection to occupants within the vehicle during travel over rough terrain, and particularly in the event of a rollover situation wherein the arms and legs of the occupants may be otherwise injured upon extending outside of the vehicle.

It should be understood that although the window net door attachment 104 is disclosed specifically in connection with the passenger door 108 of the vehicle, a driver side window net door attachment is to be coupled with a driver door of the vehicle 100. It should be further understood that the driver side window net door attachment is substantially identical to the window net door attachment 104, with the exception that the driver side window net door attachment is configured specifically to operate with the driver side of the vehicle 100. As will be appreciated, therefore, the driver side and passenger side window net door attachments may be configured as reflections of one another across a longitudinal midline of the vehicle 100. Further, it should be understood that in some embodiments wherein the vehicle comprises multiple driver side and passenger side doors, the window net door attachment may be incorporated into each of the doors, without limitation.

Moreover, it will be recognized that the passenger door 108 illustrated and discussed herein is of the "suicide door" variety (i.e., hinged at a rear of the door). It should be understood, however, that the window net door attachment 104 is not limited to being used with suicide doors, but rather the window net door attachment described herein may be coupled and used with a wide variety of vehicle doors, including, by way of non-limiting example, conventional front-hinged doors, forward swing doors, gull-wing doors, butterfly doors, sliding doors, canopy doors, scissor doors, beetle-wing doors, switchblade doors, and the like.

Figure 2:
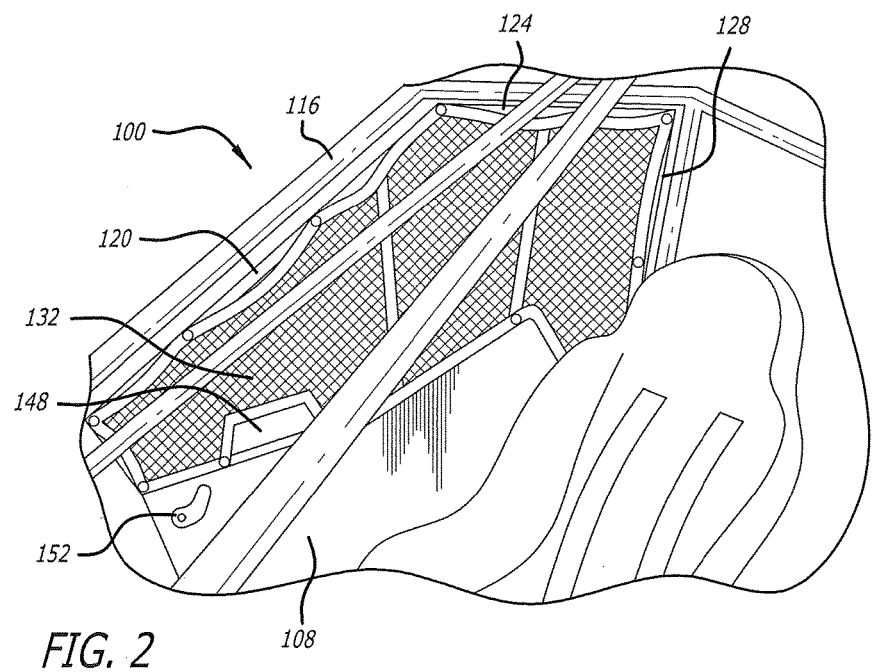
FIG. 2 is an interior view of the exemplary window net door attachment of FIG. 1 coupled to the passenger door of the vehicle.
Figure 4:
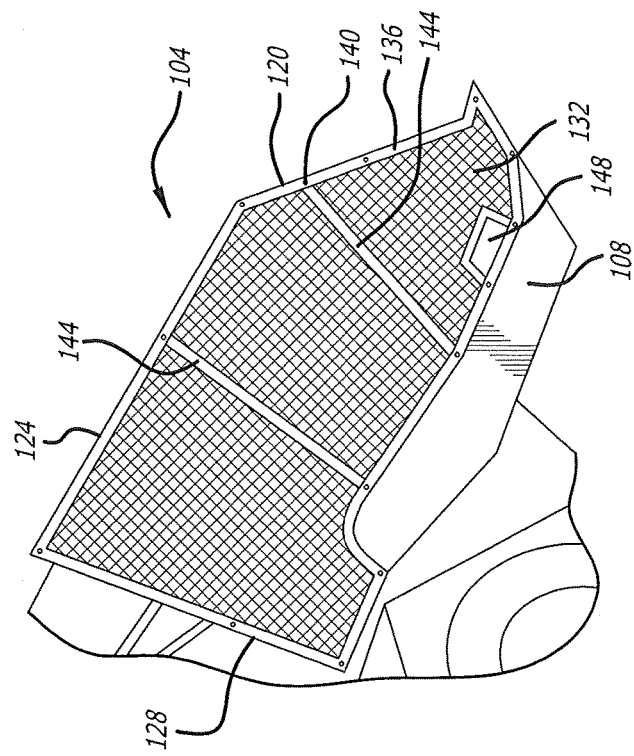
FIG. 4 is a frontward view of the opened passenger door and exemplary window net door attachment of FIG. 3.

As best shown in FIGS. 1-2, the window net door attachment 104 comprises a window frame that is coupled with the passenger door 108 and surrounds the open area bordered by the top 106 of the door 108, the roof 112, and the windshield area 116 of the vehicle 100. As shown in FIG. 2, a front frame portion 120 extends upward from a front of the top 106 of the passenger door 108 toward a lower portion of the windshield area 116. Adjacent to the windshield area 116, the front frame portion 120 comprises a sharp angled bend and then extends parallel to the windshield area 116 toward the roof 112. As best shown in FIGS. 2 and 4, a top frame portion 124 is coupled with an upper-most end of the front frame portion 120. As shown in FIG. 1, the top frame portion 124 extends rearward parallel to the roof 112. A rear frame portion 128 is joined with a rearward-most end of the top frame portion 124 and extends downward to a rear of the top 106 of the passenger door 108. It is contemplated that any of the frame portions 120, 124, 128 may be comprised of any number of bends, angled portions, curves, and the like, as needed, such that the window frame optimally surrounds the open area above the top 106 of the passenger door 108, as described.

In some embodiments, the frame portions 120, 124, 128 may be comprised of separate components that are assembled so as to form the window frame, such as, by way of non-limiting example, segments of rigid tubing that may be welded end to end so as to surround the open area above the top 106 of the passenger door 108. In some embodiments, the frame portions 120, 124, 128 may be comprised of a single component, such as, by way of non-limiting example, a hollow rigid tube of suitable diameter that is conformed to extend around the open area above the top 106 of the passenger door 108. As will be appreciated, the frame portions 120, 124, 128 preferably are comprised of a material that is suitably rigid so as to sustain impact forces and retain occupants within the vehicle 100 while traveling over rough terrain or during rolling over of the vehicle.

Moreover, it is contemplated that the front and rear frame portions 120, 128 may be rigidly coupled with the passenger door 108 by way of any of various techniques, without limitation. In some embodiments, the front and rear frame portions 120, 128 may be welded onto suitable portions of the passenger door 108. In some embodiments, the front and rear frame portions 120, 128 may fastened to the passenger door 108 by way of any of various suitable hardware fasteners, such as, by way of non-limiting example, a plurality of suitably sized nuts and bolts. In still some embodiments, the front and rear frame portions 120, 128 may be configured to be fixedly received into suitably configured slots disposed on the passenger door 108. As will be appreciated, however, in some embodiments, the passenger door 108 and the window net door attachment 104 may be manufactured as a single component that is ready for installation onto the vehicle 100 without further assembly. Furthermore, it is contemplated that in some embodiments, the passenger door 108 and the window net door attachment 104 may be comprised of a single component that is fabricated by way of stamping or injection molding. In some embodiments, additive manufacturing (AM) may be used to produce either or both of the passenger door 108 and the window net door attachment 104 in the form of a single component.

Figure 3:
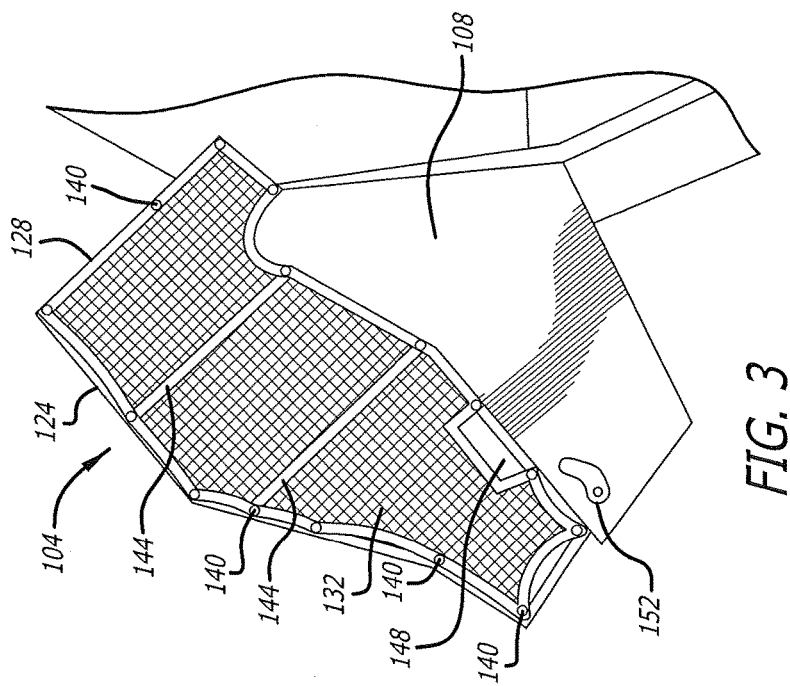
FIG. 3 is a rearward view of an opened passenger door of the vehicle and the exemplary window net door attachment of FIG. 1.

As best shown in FIGS. 3-4, a window net 132 is disposed within a boundary support 136 that is attached to the frame portions 120, 124, 128 and to the top 106 of the passenger door 108. The window net 132 may be comprised of a loosely woven material suitable for retaining the occupants within the vehicle 100, as described above. The boundary support 136 may be comprised of a tightly woven portion that is particularly well suited for attaching to the frame portions 120, 124, 128 and to the top 106 of the passenger door 108, as shown in FIGS. 3-4. The window net 132 and the boundary support 136 may be interwoven so as to form a single component. In some embodiments, however, either or both of the window net 132 and the border support 136 may be made of rubber, plastic, metal, or other suitable material, without limitation. A plurality of attachments 140 are disposed along the boundary support 136, around the perimeter of the window net 132, and are configured to retain the window net 132 in an extended disposition within the open area above the top 106 of the passenger door 108. It is envisioned that the attachments 140 may be comprised of any of various suitable hardware fasteners. In one embodiment, the attachments 140 are configured to render the boundary support 136 and the window net 132 irremovable from the frame portions 120, 124, 128 and the top 106 of the passenger door 108. In some embodiments, however, the attachments 140 may be of a quick-release variety whereby the occupants may readily detach the window net 132 from the frame portions 120, 124, 128 in the event of an emergency wherein the passenger door 108 cannot be opened.

In the embodiment shown in FIG. 3, vertical supports 144 are disposed within the window net 132 and extend from a top to a bottom of the boundary support 136. The vertical supports 144 may be tightly woven strips that are interwoven with the window net 132, similar to the boundary support 136, and are configured to impart relatively greater strength to the window net. The window net 132 further comprises a hand hole 148 disposed at a bottom thereof and near the top 106 of the passenger door 108. The boundary support 136 extends around the hand hole 148 to provide support to, and discourage fraying of, the window net 132. As will be appreciated, the hand hole 148 provides an opening whereby an interior door latch 152 may be reached and operated from outside the vehicle 100, such that the passenger door 108 may be opened and closed.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A window net door attachment configured to be coupled with a vehicle door and extend throughout an open area between a top of the vehicle door, a roof, and a windshield area of the vehicle, comprising:
    a front frame portion configured to extend from a front of the top of the vehicle door toward a lower portion of the windshield area and then extend upward adjacent to the windshield area;
    a top frame portion configured to extend from an uppermost end of the front frame portion rearward adjacent to the roof;
    a rear frame portion configured to join with a rearwardmost end of the top frame portion and extend downward to a rear of the top of the vehicle door; and
    a window net disposed within a boundary support that is attached to the front frame portion, the top frame portion, and the rear frame portion and to the top of the vehicle door, such that the window net extends throughout the open area, wherein one or more vertical supports are disposed within the window net and extend from a top of the boundary support to a bottom of the boundary support, the one or more vertical supports being tightly woven strips that are interwoven with the window net and configured to impart strength to the window net.

2. The door attachment of claim 1, wherein the window net door attachment is configured to provide protection to occupants within the vehicle during travel over rough terrain and during rolling over of the vehicle.

3. The door attachment of claim 1, wherein any of the front frame portion, the top frame portion, and the rear frame portion may be comprised of one or more bends, angled portions, and curves, such that the window net door attachment optimally surrounds the open area.

4. The door attachment of claim 1, wherein the front frame portion, the top frame portion, and the rear frame portion comprise separate components that may be assembled to extend around the open area.

5. The door attachment of claim 1, wherein the front frame portion, the top frame portion, and the rear frame portion comprise a single component that is configured to extend around the open area.

6. The door attachment of claim 1, wherein the front frame portion, the top frame portion, and the rear frame portion are comprised of a material that is suitably rigid so as to sustain impact forces and retain occupants within the vehicle during travel over rough terrain and rolling over of the vehicle.

7. The door attachment of claim 1, wherein the front frame portion and the rear frame portion are welded onto suitable portions of the vehicle door.

8. The door attachment of claim 1, wherein the front frame portion and the rear frame portion are fastened to the vehicle door by way of any of various suitable hardware fasteners.

9. The door attachment of claim 1, wherein the front frame portion and the rear frame portion are configured to be fixedly received into suitably configured slots disposed on the vehicle door.

10. The door attachment of claim 1, wherein the vehicle door and the window net door attachment are manufactured as a single component that is ready for installation onto the vehicle.

11. The door attachment of claim 1, wherein the window net is comprised of a loosely woven material suitable for retaining the occupants within the vehicle, and wherein the boundary support comprises a tightly woven portion that is interwoven with the window net.

12. The door attachment of claim 1, wherein a plurality of attachments are disposed along the boundary support and configured to retain the window net in an extended disposition within the open area, the plurality of attachments being comprised of any of various suitable hardware fasteners.

13. The door attachment of claim 1, wherein a hand hole is disposed at a bottom of the window net and near the top of the passenger door, and wherein the boundary support extends around the hand hole to provide support to, and discourage fraying of, the window net.

14. A window net door attachment configured to be coupled with a vehicle door and extend throughout an open area between a top of the vehicle door, a roof, and a windshield area of the vehicle, comprising:
    a front frame coupled with a forward portion of the vehicle door and disposed adjacently along the windshield area;
    a top frame coupled with the front frame and disposed adjacently along the roof;
    a rear frame joined with the top frame and extending to a rearward portion of the vehicle door; and
    a window net attached to one or more of the top of the vehicle door, the front frame, the top frame, and the rear frame, wherein the window net is interwoven with a boundary support and one or more vertical supports are disposed within the window net and extend from a top to a bottom of the boundary support, the one or more vertical supports being tightly woven strips that are interwoven with the window net and configured to impart strength to the window net.

15. The door attachment of claim 14, wherein the front frame, the top frame, and the rear frame are configured to be coupled so as to extend around the open area, the front frame and the rear frame being configured to be coupled with the vehicle door.

16. The door attachment of claim 14, wherein the window net door attachment is configured to provide protection to occupants during rolling over of the vehicle.

17. The door attachment of claim 14, wherein the boundary support includes a plurality of attachments that are configured to retain the window net in an extended disposition within the open area.

18. The door attachment of claim 17, wherein the window net includes a hand hole disposed near the top of the vehicle door.

\* \* \* \* \*